Jan. 8, 1957     H. H. SCHMIDGALL     2,776,762
VEHICLE UNLOADING APPARATUS
Filed April 28, 1955     3 Sheets-Sheet 1
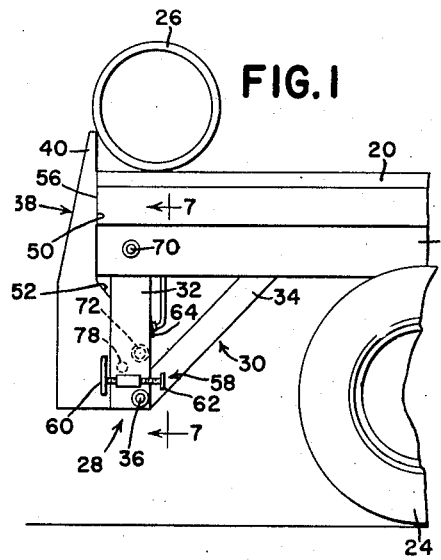
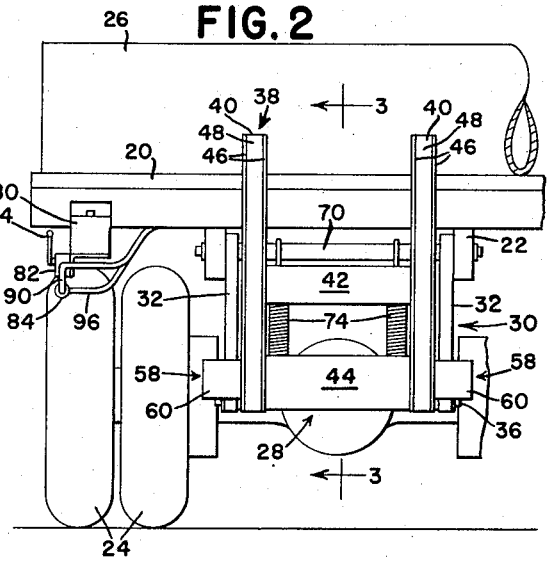
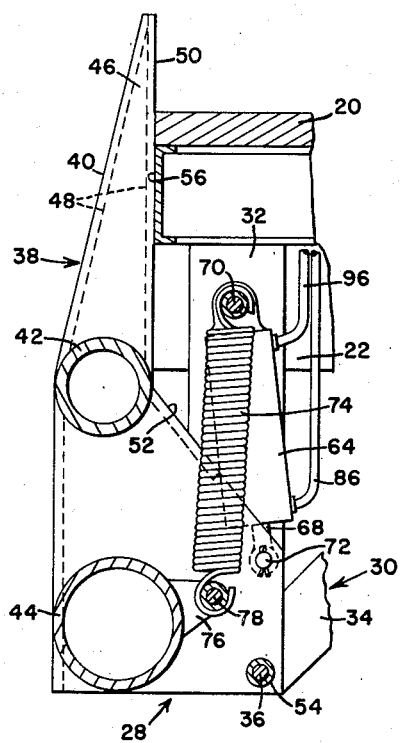
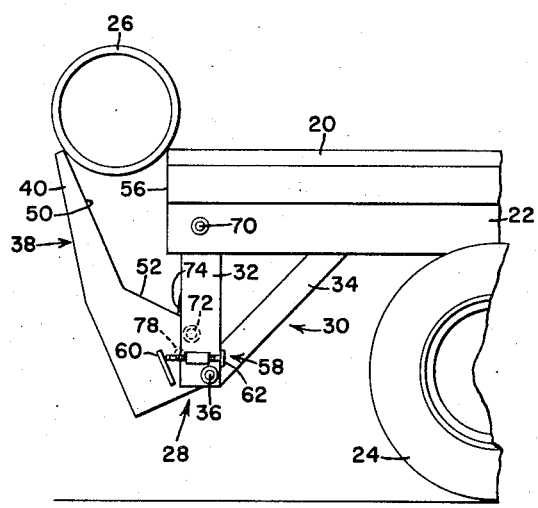
INVENTOR.
H. H. SCHMIDGALL
ATTORNEY

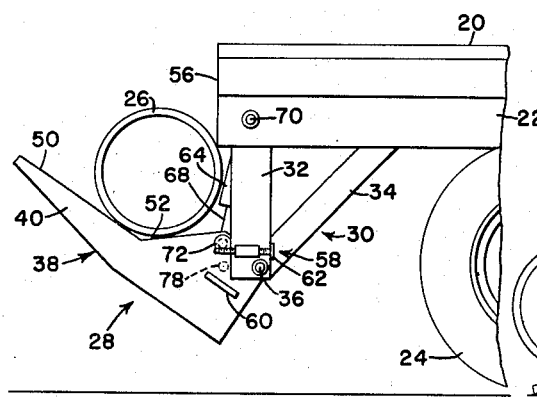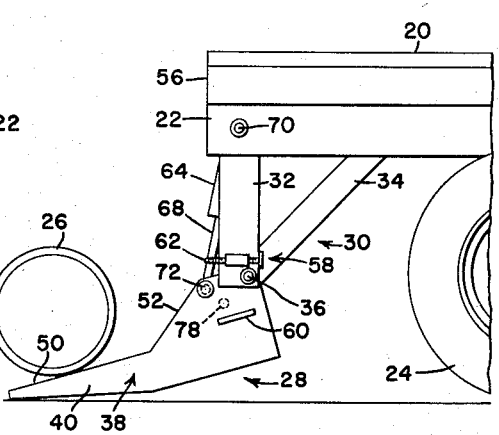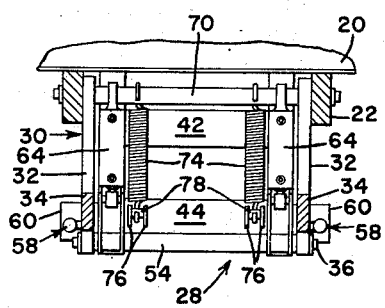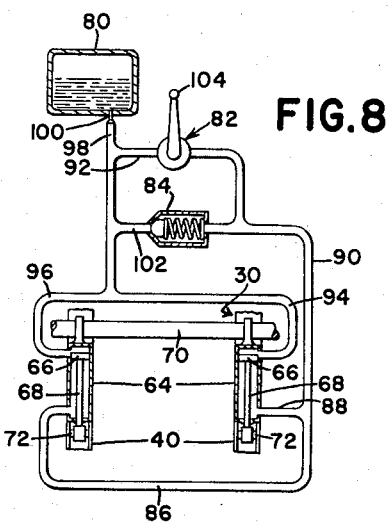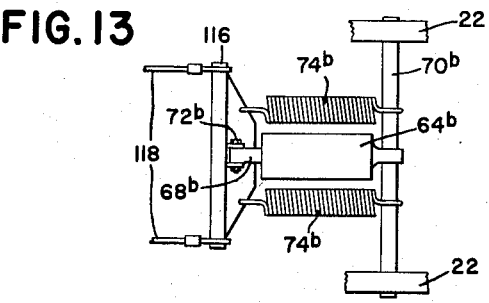

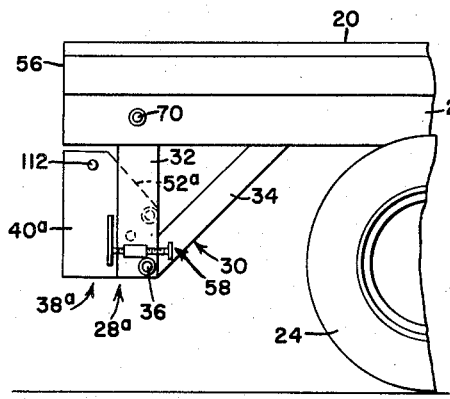
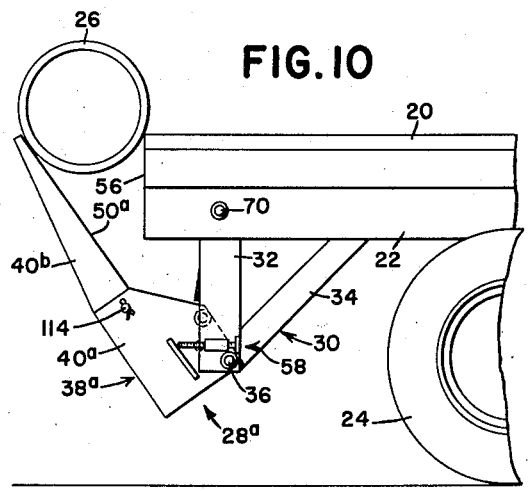
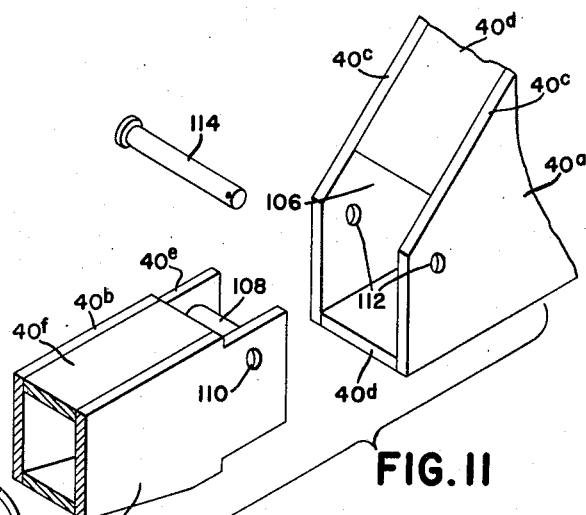
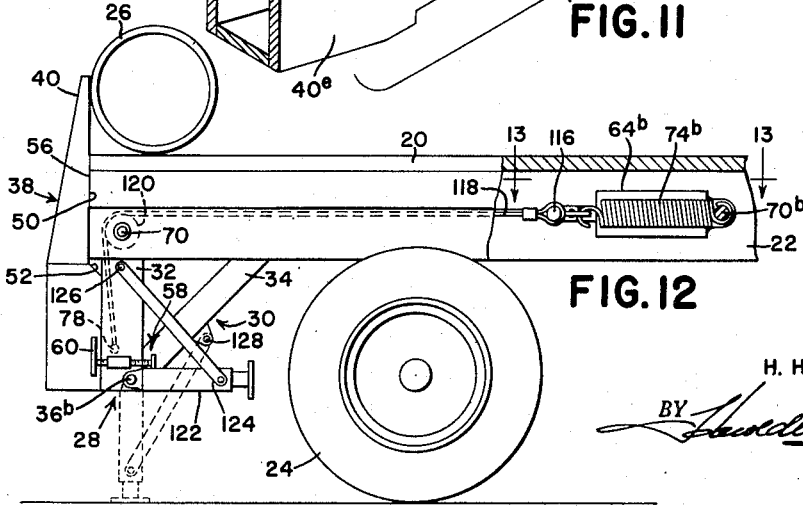

United States Patent Office 2,776,762
Patented Jan. 8, 1957

2,776,762

VEHICLE UNLOADING APPARATUS

Hartzell H. Schmidgall, Morning Sun, Iowa

Application April 28, 1955, Serial No. 504,402

12 Claims. (Cl. 214—77)

This invention relates to material-handling apparatus and more particularly to apparatus for gravitationally unloading heavy objects from a platform or the like such as the bed of a motor truck.

The invention finds its greatest utility in the handling of concrete pipe, and particularly in the gravitational unloading of such pipe from the bed or platform of the motor truck carrier on which the pipe is customarily shipped. Because of the relatively fragile nature of such pipe, it cannot be dropped from substantial heights without danger of fracture. Therefore, some means must be afforded for lowering the pipe to the ground. In the past, ramps have been used for allowing the pipe to roll to the ground but the speed at which the pipe descends is too great to permit ready handling. According to the present invention, these difficulties are eliminated by the provision of an improved apparatus for receiving the pipe from the discharge edge of the platform or truck and for lowering the pipe gradually and relatively gently to the ground. The invention features automatic gravitational descent and discharge of the pipe, utilizing primarily a wedging action of the pipe between a guide and a fork which establish an ever-widening V into which the pipe gradually descends. A further feature of the invention is the arrangement of the fork or arm means relative to the support or guide element in such manner that when the pipe reaches a certain point in its descent, angularly related portions of the arm means or fork cause the pipe to move toward the discharge end of the fork, from which it rolls slowly to the ground.

It is an important object of the invention to utilize improved snubbing means, preferably hydraulic, for regulating the descent of the pipe and fork means. Further objects reside in the utilization of biasing means for returning the fork means to receiving position, detachable arm sections on the fork means for permitting ready folding of the fork means for transport purposes, and a novel and inexpensive arrangement of supporting structure and fork means that provide a convenient attachment of the apparatus to motor vehicles of existing constructions.

Still further objects include the provision of a modified arrangement of the snubbing or retarding means and biasing means for special application to vehicles of certain types; and the provision of outrigger ground-engaging means associated with the supporting structure for rigidifying the vehicle during unloading.

The foregoing and other important objects and desirable features inherent in and encompassed by the invention will become apparent as preferred embodiments of the invention are disclosed in detail in the following specification and accompanying sheets of drawings, the several figures of which will be described immediately below.

Fig. 1 is a side elevational view of the rear portion of a motor truck equipped with one form of the material-handling apparatus.

Fig. 2 is a fragmentary rear view of the structure shown in Fig. 1.

Fig. 3 is a sectional view, on an enlarged scale, as seen along the line 3—3 of Fig. 2.

Fig. 4 is a view similar to Fig. 1 but showing the fork or arm means in pipe-receiving position.

Fig. 5 is a view similar to Fig. 4 but showing the fork means in a further position in its descent.

Fig. 6 is a similar view, showing the fork means in its discharge position.

Fig. 7 is a sectional view as seen along the line 7—7 of Fig. 1.

Fig. 8 is a schematic view, partly in section, showing the hydraulic circuit for controlling the snubbing means.

Fig. 9 is a view similar to Fig. 1, but showing a modified form of the invention in which the fork means includes removable fork sections.

Fig. 10 is a view of the structure shown in Fig. 9, illustrating the removable fork sections in place and showing the fork in pipe-receiving position.

Fig. 11 is a perspective exploded view showing the manner of mounting of the removable fork sections.

Fig. 12 is a view similar to Fig. 1 but showing a modified arrangement.

Fig. 13 is a fragmentary plan view as seen along the line 13—13 of Fig. 12.

The invention is illustrated in connection with the bed or platform 20 of a motor vehicle of otherwise conventional construction having a frame 22 supported in the usual manner on wheels 24. The numeral 26 illustrates a concrete pipe as representative of a rolling object, several of which are conventionally carried on the platform 20 for transport from one place to another. The problem solved by the present invention is the unloading of the pipe or objects to the ground, for which purpose the truck is equipped with an unloading attachment designated in its entirety by the numeral 28.

The attachment may, of course, be built in as an integral part of the truck. In any event, it comprises essentially supporting structure 30 including a pair of transversely spaced upright supports or guide elements 32 and appropriate diagonal braces 34. These elements may be rigidly attached to the frame 22 in any suitable manner, as by welding, riveting or bolting, which details are without substantial significance here.

The guide elements or supports 32 respectively have lower end portions which support a cross shaft or pivot 36, affording a transverse pivot parallel to and below the rear or discharge edge of the truck bed or platform 20. The supporting structure 30 supports, by way of the pivot 36, a fork or arm means indicated in its entirety by the numeral 38. This fork comprises a pair of laterally spaced apart arms or tines 40, rigidly cross-connected by tubular cross members 42 and 44 of relatively high strength. Each arm includes closely spaced apart side plates 46 and interposed spacer plates 48, the assembly preferably being of welded fabrication. The shape of each arm is such that it has a pair of straight pipe-engageable edges or sides 50 and 52. These sides adjoin or intersect to form an obtuse angle substantially in the vicinity of the upper cross pipe 42 (Fig. 3). The arm structure is completed by a cross tube 54 which affords an arm-mounting journal on the pivot 36.

From the foregoing description, it will be seen that the pivot means 36—54 mounts the arm 38 on the support structure 30 for swinging movement between the positions of Figs. 1 and 6, the arm means passing successively through the positions of Figs. 4 and 5. Fig. 1 shows the transport position of the arm means 38, whereby it is in position to receive the pipe 26. Fig. 4 shows the pipe-receiving position, in which it will be noted that the free end of the arm means 38 is substantially at the level of the top of the platform 20, and the edge or side 50 of the arm means forms what may be termed a V or an acute angle with the guide element established by a guide element portion 56 in depending relationship to the upper surface of the platform 20. As the pipe 26 is received in the V just described, its weight is sufficient to cause it to gravitate between the edges or elements 50 and 56, thereby forcing the arm means 38 from the position of Fig. 4 to that of Fig. 5, wherein it will be seen that the relationship between the elements 50 and 56 is such that an ever-widening V is accomplished. Fig. 5 illustrates that the pipe is now received or cradled between the arm sides 50 and 52, the obtuse angle thereby afforded preventing the pipe from immediately rolling off of the discharge or free end of the arm means. However, as the weight of the pipe causes the arm means 38 to move to the position of Fig. 6, the side or edge 52 serves as means for causing the pipe 26 to roll down the edge 50 and thus to the ground. In short, during movement of the arm means 38 from the position of Fig. 1 to a position just preceding that of Fig. 5, the portion or side 52 of the arm means does not operate to engage the pipe but gradually emerges from its position alongside of the support elements 32 until it comes into play in the positions of Figs. 5 and 6.

The foregoing describes generally the phases of movement of the arm means 38. Once the arm means has been moved from its position of Fig. 1 to that of Fig. 6, it is desirable to halt its return movement in the receiving position of Fig. 4. For this purpose, stop means is provided, which stop means is indicated in its entirety by the numeral 58. There may be a stop means at each side of the structure 28 (Fig. 2). In any event, each stop means preferably comprises a stop plate 60 welded or otherwise rigidly secured to the associated arm 40, together with a screw-threaded member 62 appropriately mounted on the associated upright support 32. In the position of Fig. 1, the screw-threaded member 62 is backed off so that the side 52 of the arm means 38 may abut the rear element 56 of the platform 20. In the position of Fig. 4, the screw-threaded member 62 is turned in so as to establish an abutment engaged by the associated stop plate 60. Proper adjustment of the stop means will establish the position of the arm means 38 so that the free end thereof is substantially at the level of the top of the platform 20. After the unloading operation is completed, the screw member 62 may be backed off so that the arm means 38 can return to the transport position of Fig. 1.

The novelty of the scissor or wedging action as accomplished by the relationship between the arm means and the truck and supporting structure is enhanced by the provision of means for retarding the descent of the arm means, which retarding means is tied in also with the relationship of the elements 50 and 52 for effecting the ultimate discharge of the pipe (Fig. 6). Associated with the retarding or snubbing means is means for returning the arm means 38 to its receiving or transport positions. The retarding means preferably comprises a pair of cylinder and piston assemblies, each including a cylinder 64, piston 66 and piston rod 68. The cylinders are appropriately pivotally connected to a cross shaft or support 70 that is carried between opposite sides of the truck frame 22; and the free end of each piston rod 68 is pivotally connected by a pin 72 to the associated arm 40. Although two cylinders are shown, as preferred in the interests of equalization and economy, a single larger cylinder or even more than two cylinders could be used. Since the cylinders are connected between the shaft 70, which is part of the basic supporting structure, and the pins 72, which are parts of the arm means 38, the regulation of fluid flow from the piston rod sides of the pistons 66 will determine the speed at which the loaded arm means 38 will descend. Regulation of the discharge of fluid from the opposite sides of the pistons will determine the speed at which the arm means 38 will be returned by biasing means in the form of a pair of tension springs 74, each of which has its upper end hooked over the cross shaft 70 and each of which has its lower end connected to an arm 76 welded or otherwise rigidly secured to the lower cross tube 44 (Fig. 3). Connection of the lower end of the spring to the arm 76 is accomplished by a pin 78. In the interests of avoiding confusion in Figs. 1, 4, 5 and 6, dotted-line illustration of the springs 74 is omitted, but for the purposes of ready reference, the point of connection at 78 of the springs 74 is shown so that the line of force between the points 70 and 78 can be readily visualized. The actual structure will be available from an examination of Fig. 3.

Fig. 8 illustrates the fluid-controlling circuit as including a reservoir 80, a control valve 82 and a check valve 84, together with appropriate fluid lines to be presently described. The lower ends of the cylinders 64 are connected respectively by branch lines 86 and 88 to a common exhaust line 90, which line enters the control valve 82. A line 92 leaves the valve 82 and has branches 94 and 96 connected respectively with the upper ends of the cylinders 64. The line 92 also has a make-up branch 98 connected by means of a restricted orifice 100 with the reservoir 80. The check valve 84 is located in a by-pass line 102 that cross-connects the lines 90 and 92. The reservoir 80 and valve 82 may be structurally incorporated in a unit having a suitable mounting on the side poriton of the rear of the truck platform 20 (Fig. 2), and the valve may be suitably controlled by a handle 104. The operation of the circuit of Fig. 8 may be best understood from a description of the over-all operation of the apparatus, which will follow.

As previously described, it is preferable to utilize the stop means 58 to establish the receiving position of Fig. 4. The first pipe 26 on the load of pipe will be rolled off of the platform into the V established between the elements 50 and 56. The valve handle 104 is moved the desired amount to control the size of the opening through the valve 82 through which fluid will flow from the lines 86, 88 and 90 to the lines 92, 94 and 96. Fluid will then be exhausted from the lower ends of the pistons 66. This fluid must flow through the valve 82, since it cannot flow through the check valve 84. As this fluid passes through the valve 82, it will return to the upper ends of the cylinders 64, because of the difference in pressure. There will, of course, be a volumetric deficiency between the lower sides of the pistons 66 and the upper sides thereof, which deficiency will be made up through the make-up orifice 100 and make-up branch 98. Fluid flowing from the bottoms of the cylinders 64 will not enter the reservoir, because the path of least resistance is through the line 92 to the branches 94 and 96. The operator may, by appropriate use of the control handle 104, regulate the size of the opening through the control valve 82 and thus determine the speed of descent of the loaded arm means or fork 38. Once set, the valve 82 need not be further adjusted, provided that the speed of operation is appropriate, since the return springs 74 will return the arm means 38 to the position of Fig. 4 and the next pipe may be rolled into place to be discharged as the arm means descends through the positions of Figs. 5 and 6.

The check valve 84 affords means whereby the ascent or return of the arm means 38 will be at a more rapid rate, since the fluid does not have to flow reversely through the valve 82 but may flow in by-pass fashion through the by-pass line 102 and check valve 84. As the arm means 38 returns to its Fig. 4 position, fluid from the upper ends of the cylinders 64 flows through the by-pass means 84—102 to the lower ends of the respective cylinders. Volumetric excess is accommodated by the reservoir 80 through the branch 98 and orifice 100. Therefore, although the speed of drop or descent of the arm means may be relatively slow, the speed of return is relatively fast, all of which contributes to the efficient use of the apparatus in easily and rapidly unloading pipe from the truck platform 20.

It will be seen that as the points 72 and 78 change during descent of the arm means 38, the effective moment arms and forces involved afford a substantially uniform rate of descent, since, as the pipe 26 descends into the ever-widening V, the effective forces developed by reason of the wedging action become greater, and the effective moment arms against which the springs and cylinder and piston assemblies operate become correspondingly longer.

As already described, the pipe 26 gradually descends into the ever-widening V until it is cradled between the arm portions 50 and 52 (Fig. 5). As the arm means is caused to descend, the obtuse angle between the portions 50 and 52 is effective to cause the pipe 26 to roll to the free or discharge ends of the arm means, thereby increasing the lever arm about the pivot 36 so that it is impossible for the loaded arm means 38 to halt at any position in its range, except as controlled by the control valve 82. That is to say, with the control valve 82 normally opened or "cracked" there should be no interference with the continual operation of the apparatus as long as pipe is available and is moved one by one into the receiving V. However, the operator may deliberately close the valve 82 and halt the operation at any desired point in the descent of the arm means.

The arm means is suitable for accommodating pipes of varying sizes, even pipes of larger diameters than that illustrated. The stop means 58 is adjustable to achieve the receiving position of Fig. 4 and, already described, may be backed off to achieve the transport position of Fig. 1.

It will be noted from Fig. 3 that the piston rod mounting pin 72 is slightly over center as respects the points 70 and 36 when the arm means 38 is in its transport position. This means that intial movement of the arm means must overcome the restriction at 100 or the pressure in the check valve 84, which is normally effective to keep the arm means in its transport position, especially because the springs 74, acting on the other side of a line between the points 36 and 70, must also be stretched before the arm means can be moved to its discharge position.

In the modified form of the invention shown in Figs. 9, 10 and 11, there is featured arm means 38a comprising part of a modified form of apparatus 28a in which the supporting structure 30 is identical to that previously described, the difference being that the arm means 38a is made up of first and second arm sections 40a and 40b. The mounting and control characteristics of the modified form of arm 38a are the same as those previously described. Accordingly, there will be found in Figs. 9 and 10 reference characters previously used in the description of Figs. 1 through 8, such as the upper cross shaft 70, the arm pivot 36, the stop means 58, the supporting structure 30 and elements 32 and 34 thereof, as well as the rear guide element 56 on the truck platform 20.

As shown in Fig. 9, the first arm section 40a is of such length as to lie below the platform 20 when the arm means 38 is in its folded or transport position. The arm section 40 is very much like the lower portion of the previously described arm 40 and incorporates an edge or portion 52a. The removable section 40b incorporates the edge or portion 50a, so that when the two sections are interconnected as shown in Fig. 10, the functional characteristics are identical to those previously described.

The removability and reconnection of the sections 40a and 40b is established by the structure illustrated in Fig. 11, wherein it will be seen that the arm section 40a is made up of side plates 40c and cross plates 40d, the plates being appropriately interrupted to afford a socket for receiving the proximate end of the arm section 40b.

The section 40b has appropriate side plates 40e and cross plates 40f, the former being cross-connected at the end proximate to the end section 40a by a cross tube 108 which opens through the plates 40e in registering apertures 110, only one of which is visible. When the sections 40a and 40b are assembled, the tube 108 and apertures 110 register with apertures 112 in the section 40a and the registering apertures receive a removable fastener in the form of a headed pin 114. When the section 40b is removed from the section 40a, the rear portion of the truck platform 20 is level and there will be no interference with the loading, unloading or transporting of other articles. The control valve 82 may be opened relatively wide to permit ready movement of the arm means 38 to the position of Fig. 10, the stop means 58 may be adjusted to retain that position and the arm sections 40b may be assembled by means of the pins 114

Figs. 12 and 13 illustrate an arrangement of the snubbing or retarding means in a vehicle in which there may not be sufficient space at the rear for the arrangements of Figs. 1–6, for example. In this modified structure, the attachment as a unit includes a majority of components identical to those of Figs. 1–6 and similar reference numerals will be employed. The attachment 28 has the support structure 30, arm means 38, stop means 58, and such sub-elements as 32, 34, 36, 40, 50, 52, 56, 60, 70 and 78. The modification comprises the use of a single larger cylinder 64b mounted on a crossbar 70b supported by opposite sills of the frame 22. The piston rod 68b is pivotally connected at 72b to an equalizer 116, from laterally spaced portions of which cables 118 extend to be trained respectively about sheaves 120 that are journaled on the cross shaft 70. The ends of the cables are dead-ended to the arm means 38 at 78. Springs 74b are connected between the equalizer 116 and the crossbar 70b (Fig. 13). The operational characteristics follow the pattern developed above relative to Figs. 1–6, it being understood that the hydraulic control circuit of Fig. 8 is employed, with the exception, of course, that the single cylinder 64b replaces the two cylinders 64.

Another feature shown particularly in Fig. 12, and one that is useful also with the structures of Figs. 1–6 and 9–11, is the outrigger support means, comprising a pair of jacks or adjustable standards 122 (only one of which is shown) pivoted on lateral extensions 36b of the pivot shaft 36. In transport position, each jack is carried as shown in full lines in Fig. 12, being releasably retained in this position by a link 124. When in use, the jacks are swung down to supporting positions (dotted lines, Fig. 12) and each link is disconnected at 126 and reconnected at 128, the points 126 and 128 being shown respectively on the arm means 38 and the support structure 30. The jacks are especially useful in trucks in which the rear wheels are somewhat forwardly of the rear edge of the platform, the jacks thereby preventing downward deflection of the platform and possible raising of the front end of the truck or trailer during unloading. As will be obvious, the jacks could be readily incorporated in Figs. 1–6 and 9–11 and by this reference will be so considered.

Various features of the invention have been outlined in the introduction to the disclosure. Others will be apparent from the foregoing description. Those not categorically enumerated will readily occur to those versed in the art, as will many modifications and alterations in the preferred embodiments of the invention illustrated, all of which may be achieved without departure from the spirit and scope of the invention.

What is claimed is:

1. Apparatus for gravitationally unloading objects from the edge of a platform or the like, comprising: support structure adjacent to the platform and including a horizontal pivot spaced below the platform edge and a generally upright guide element extending from the pivot into proximity to the platform edge; arm means mounted on the pivot for descent from a generally upright receiving position to a substantially horizontal discharge position, said arm means in its receiving position having its free end spaced from the edge of the platform to be engaged and moved outwardly and downwardly by an object moving over said edge, said arm means in descending forming with the guide element an ever-widening V into which the object gravitates to create a wedging action so that the object follows the guide element and thereby travels substantially a straight-line path for forcing the arm means toward its discharge position; and means connected to the arm means and operating to retard the descent of the arm means and object.

2. The invention defined in claim 1, including: stop means operative between the arm means and the support structure for limiting return movement of the arm means toward its receiving position so that the free end of the arm means is spaced from the platform edge in the direction of descent of the arm means.

3. The invention defined in claim 1, in which: the length of the arm means exceeds the distance between the top of the platform and the pivot and said arm means comprises a pair of end-to-end main and auxiliary sections separably interconnected at a junction spaced from the pivot a distance less than the distance between the top of the platform and the pivot so that the arm means in its generally upright receiving position may be shortened to dispose the upper end of the main section substantially upright and just below the platform top.

4. The invention defined in claim 3, in which: the junction between said sections includes a socket on one section, a socket-received portion on the other section, and a removable fastener releasably securing said sections together.

5. Apparatus for gravitationally unloading objects from the edge of a platform or the like, comprising: support structure adjacent to the platform and including a horizontal pivot spaced below the platform edge and a generally upright guide element extending from the pivot into proximity to the platform edge; arm means mounted on the pivot for descent from a generally upright receiving position to a substantially horizontal discharge position, said arm means having thereon a first object-supporting portion arranged generally as a radius from the pivot and extending to the free end of the arm means, said portion in the receiving position of the arm means forming with the guide element a relatively narrow V into which an object moving off of the platform edge gravitates to widen the V and force the arm means toward its discharge position; said arm means having thereon a second object-supporting portion adjacent to the pivot and rigid with and forming an obtuse angle with said first portion to afford an upwardly facing notch for receiving the object as the arm means approaches its discharge position; and said first and second portions being so arranged and related that in the discharge position of the arm means the first portion is substantially horizontal and the second portion inclines downwardly and in the direction of the free end of the arm means so as to cause the object to gravitate toward said free end.

6. Apparatus for gravitationally unloading objects from the edge of a platform or the like, comprising; support structure positioned adjacent to the platform edge and including a pair of uprights in depending relation to the platform and spaced apart on a line parallel to the platform edge, said uprights having lower portions spaced below the platform edge and having pivot means on a horizontal axis paralleling said edge; an unloading fork pivoted to the pivot means for swinging from a generally upright receiving position to a substantially horizontal discharge position, said fork including a pair of spaced apart fork arms rigidly cross-connected by a bar adjacent to and paralleling the pivot means, each fork arm in the receiving position of the fork forming with the respective upright a relatively narrow V into which an object moving off the edge of the platform gravitates to create a wedging action forcing the fork to descend to its discharge position so that the object is dischargeable from the free ends of the fork arms; snubber means retarding the descent of the fork and object, including a pair of fluid cylinder and piston assemblies connected to the support structure and connected respectively to the arms adjacent to the pivot means; and yielding means biased to return the fork to its receiving position, including a pair of tension springs, each connected at one end to the support structure above the pivot means and each connected at its other end to the crossbar.

7. Apparatus for gravitationally unloading objects from the edge of a platform or the like, comprising: support structure associated with the platform and having upright means set back from the platform edge and depending therefrom to a horizontal pivot spaced below said edge; an arm pivoted to the upright means on said pivot and swingable from a folded position alongside the upright means to a substantially horizontal discharge position, said arm being shorter than the distance between the platform and the pivot so that said arm lies below the platform and rearwardly of the upright means in the folded position thereof; an extension operative as an elongation of the arm when said arm is swung out of its folded position and combining with said arm to afford arm means of a length greater than the aforesaid distance between the platform and the pivot, said arm means as a whole having an object-receiving position intermediate the folded and horizontal positions, said arm means in its receiving position having its free end spaced from the edge of the platform to be engaged and moved outwardly and downwardly by an object moving over said edge, said arm means in descending forming with the guide element an ever-widening V into which the object gravitates to create a wedging action forcing the arm means to its discharge position; and means connected to the arm means and operating to retard the descent of the arm means and object.

8. In a vehicle having a wheel-supported platform at a level above the ground: apparatus for gravitationally unloading objects from the vehicle platform comprising: support structure adjacent to the platform and including a horizontal pivot spaced below the platform edge and a generally upright guide element extending from the pivot into proximity to the platform edge; arm means mounted on the pivot for descent from a generally upright receiving position to a substantially horizontal discharge position, said arm means in its receiving position having its free end spaced from the edge of the platform to be engaged and moved outwardly and downwardly by an object moving over said edge, said arm means in descending forming with the guide element an ever-widening V into which the object gravitates to create a wedging action forcing the arm means to its discharge position; and ground-engaging support means connected to the support structure and engageable with the ground to support the platform rigidly from the ground during unloading.

9. The invention defined in claim 8, in which: the ground-engaging support means is connected to the support structure for selective dual positioning, having a transport position clear of the ground and a working position engaging the ground; and means is provided for releasably retaining said ground-engaging support means in its transport position.

10. The invention defined in claim 9, in which: the dual-positionable mounting of the ground-engaging support means is pivotal and is afforded by the aforesaid horizontal pivot.

11. The invention defined in claim 1, including: a pair of coaxial sheaves carried by the supporting structure above the horizontal pivot, a pair of cables, each connected at one end to the arm means, and trained respectively over and extending beyond the sheaves to respective free ends, a fluid cylinder and piston assembly connected to the platform, and an equalizer having transversely spaced portions connected respectively to the free ends of the two cables and an intermediate portion connected to the cylinder and piston assembly.

12. The invention defined in claim 11, including: a pair of springs connected to the crossbar and to the equalizer in laterally spaced apart relation, one at each side of the cylinder and piston assembly.

References Cited in the file of this patent

UNITED STATES PATENTS

| | | |
|---|---|---|
| 2,665,815 | Blight | Jan. 12, 1954 |
| 2,670,861 | Fondriest et al. | Mar. 2, 1954 |
| 2,680,529 | Narvestad et al. | June 8, 1954 |
| 2,703,656 | Banks | Mar. 8, 1955 |